(12) United States Patent
Niewiadomski et al.

(10) Patent No.: US 11,385,651 B2
(45) Date of Patent: Jul. 12, 2022

(54) SYSTEM AND METHODS FOR DETECTION AND RESPONSE TO INTERFERENCE BETWEEN TRAILER COUPLER AND HITCH BALL

(71) Applicant: Ford Global Technologies, LLC, Dearborn, MI (US)

(72) Inventors: Luke Niewiadomski, Hamtramck, MI (US); Erick Michael Lavoie, Dearborn, MI (US); Rudi Todd Ansbacher, Westland, MI (US); Anton L. Rogness, II, Dearborn, MI (US); Elliott G. Pearson, Shelby Township, MI (US); Andrew D. Niedert, Farmington Hills, MI (US); Joshua Rajasingh, Ypsilanti, MI (US); Lucian K. M. Lippok, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 294 days.

(21) Appl. No.: 16/018,954

(22) Filed: Jun. 26, 2018

(65) Prior Publication Data

US 2019/0391590 A1 Dec. 26, 2019

(51) Int. Cl.
*G05D 1/02* (2020.01)
*B60D 1/36* (2006.01)
*B60D 1/46* (2006.01)
*G01L 5/13* (2006.01)

(52) U.S. Cl.
CPC ............ *G05D 1/0231* (2013.01); *B60D 1/36* (2013.01); *B60D 1/46* (2013.01); *G01L 5/136* (2013.01); *B60Y 2400/305* (2013.01); *G05D 2201/0213* (2013.01)

(58) Field of Classification Search
CPC ... B60D 1/36; B60D 1/46; B60D 1/62; B60D 1/06; B60D 1/58; B60Y 2400/305; G05D 1/0231; G05D 2201/0213
See application file for complete search history.

(56) References Cited

U.S. PATENT DOCUMENTS

| | | | |
|---|---|---|---|
| 3,909,075 | A | 9/1975 | Pittet, Jr. et al. |
| 3,981,542 | A | 9/1976 | Abrams et al. |
| 5,080,445 | A | 1/1992 | Brearley et al. |
| 5,352,028 | A | 10/1994 | Eccleston |
| 5,951,035 | A | 9/1999 | Phillips, Jr. et al. |
| 6,068,352 | A | 5/2000 | Kulkarni et al. |
| 6,615,125 | B2 | 9/2003 | Eccleston et al. |

(Continued)

FOREIGN PATENT DOCUMENTS

| | | |
|---|---|---|
| DE | 102004008928 A1 | 9/2005 |
| DE | 102014114078 A1 | 4/2015 |

(Continued)

*Primary Examiner* — Todd Melton
(74) *Attorney, Agent, or Firm* — Raymond Coppiellie; Price Heneveld LLP

(57) ABSTRACT

A vehicle system comprises a hitch mounted on a vehicle and at least one sensor in connection with the hitch. A controller is configured to identify a force applied to the hitch via the at least one sensor. In response to the force, the controller is further configured to approximate a direction of the force. Based on the direction, the controller generates instructions identifying a height adjustment of a coupler of a trailer.

18 Claims, 9 Drawing Sheets

(56) References Cited

U.S. PATENT DOCUMENTS

| | | |
|---|---|---|
| 8,511,759 B2 | 8/2013 | Marsden et al. |
| 8,789,896 B2 | 7/2014 | Albright et al. |
| 9,031,754 B2 | 5/2015 | Matoy et al. |
| 9,102,271 B2 | 8/2015 | Trombley et al. |
| 9,434,381 B2 | 9/2016 | Windeler |
| 9,457,632 B1 | 10/2016 | Windeler et al. |
| 9,550,399 B2 | 1/2017 | Jones et al. |
| 9,914,333 B2 * | 3/2018 | Shank ................ B62D 15/0285 |
| 2006/0293800 A1 | 12/2006 | Bauer et al. |
| 2009/0138160 A1 * | 5/2009 | Iyoda ................ B60R 21/0134 |
| | | 701/45 |
| 2013/0253814 A1 * | 9/2013 | Wirthlin ................ G01G 19/02 |
| | | 701/124 |
| 2014/0172237 A1 * | 6/2014 | Uchida ............... B60R 21/0136 |
| | | 701/46 |
| 2014/0183841 A1 | 7/2014 | Jones |
| 2015/0035253 A1 * | 2/2015 | Materna .................. B60D 1/36 |
| | | 280/477 |
| 2015/0115571 A1 | 4/2015 | Zhang et al. |
| 2015/0353063 A1 | 12/2015 | Tuhro et al. |
| 2016/0185169 A1 | 6/2016 | Strand |
| 2016/0236526 A1 | 8/2016 | Shepard |
| 2017/0158007 A1 | 6/2017 | Lavoie |
| 2018/0081370 A1 * | 3/2018 | Miller .................. B60W 10/04 |
| 2018/0312022 A1 | 11/2018 | Mattern et al. |
| 2019/0092109 A1 * | 3/2019 | Carpenter ................ G06N 3/08 |

FOREIGN PATENT DOCUMENTS

| | | |
|---|---|---|
| DE | 102014110498 A1 | 1/2016 |
| DE | 102015213404 A1 | 1/2017 |
| DE | 102016123600 A1 | 6/2017 |
| EP | 0697314 B1 | 2/1996 |
| EP | 2199166 A1 | 6/2010 |
| GB | 2282424 | 9/1995 |
| KR | 20160084608 * | 7/2016 |
| WO | 9939952 | 8/1999 |
| WO | 2015005795 A2 | 1/2015 |

* cited by examiner

SYSTEM AND METHODS FOR DETECTION AND RESPONSE TO INTERFERENCE BETWEEN TRAILER COUPLER AND HITCH BALL

FIELD OF THE DISCLOSURE

The present disclosure generally relates to a system for assisting in a vehicle-trailer hitching operation. In particular, the present disclosure relates to a system for detecting a force applied to a hitch assembly and related applications.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE DISCLOSURE

According to one aspect of the present disclosure, a vehicle system is disclosed. The system comprises a hitch mounted on a vehicle and at least one sensor in connection with the hitch. A controller is configured to identify a force applied to the hitch via the at least one sensor. In response to the force, the controller is further configured to approximate a direction of the force. Based on the direction, the controller generates instructions identifying a height adjustment of a coupler of a trailer.

Embodiments of the first aspect of the invention can include any one or a combination of the following features:
- the controller is configured to identify the force as a longitudinal force applied along a length of the hitch and a load force applied along a height of the ball;
- the at least one sensor comprises a first sensor configured to measure the load force and a second sensor configured to measure the longitudinal force;
- the controller is configured to identify a direction of the height adjustment in response to the direction;
- the controller is configured to output an instruction indicating the height adjustment of the coupler height in response to the force exceeding a threshold;
- the controller is configured to control motion of the vehicle in an automated hitch alignment routine, and stop the motion of the vehicle in response to the force exceeding a threshold;
- the controller is configured to continue the automated hitch alignment routine in response to the force being less than the threshold;
- a sensor apparatus in communication with the controller, wherein the sensor apparatus is configured to scan a region proximate the vehicle and detect the coupler position of the coupler of the trailer;
- the sensor apparatus comprises an imaging system including one or more cameras mounted on the vehicle, wherein the controller identifies the coupler position based on image data received from the imaging system comprising position data of the coupler;
- the controller is configured to identify a collision in response to the detection of the force in combination with the hitch being within a predetermined distance of the coupler position;
- the predetermined distance identifies that the hitch is within a collision proximity relative to the coupler; and
- the coupler position is a location of the coupler of the trailer, wherein the coupler is configured to mate to the hitch in a towing configuration.

According to another aspect of the present disclosure, a method for controlling a vehicle system is disclosed. The method comprises receiving detection signals from a vehicle hitch sensor identifying a force applied to a vehicle hitch. The method further comprises detecting a force direction of the force based on the detection signals. In response to the force direction, the method comprises generating instructions for adjusting a height of the coupler.

According to another aspect of the present disclosure, a system for a vehicle is disclosed.

The system comprises a hitch mounted on a vehicle and an imaging system including one or more cameras mounted on a vehicle. A force sensor is in connection with the hitch. The system further comprises a controller configured to identify a coupler position based on image data received from the imaging system and control motion of the vehicle aligning the hitch with the coupler position. The controller is further configured to detect a force applied to the hitch via the force sensor and in response to the force, approximate a force direction of a coupler of a trailer. Based on the force direction, the controller is configured to generate instructions for adjusting a height of the coupler.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
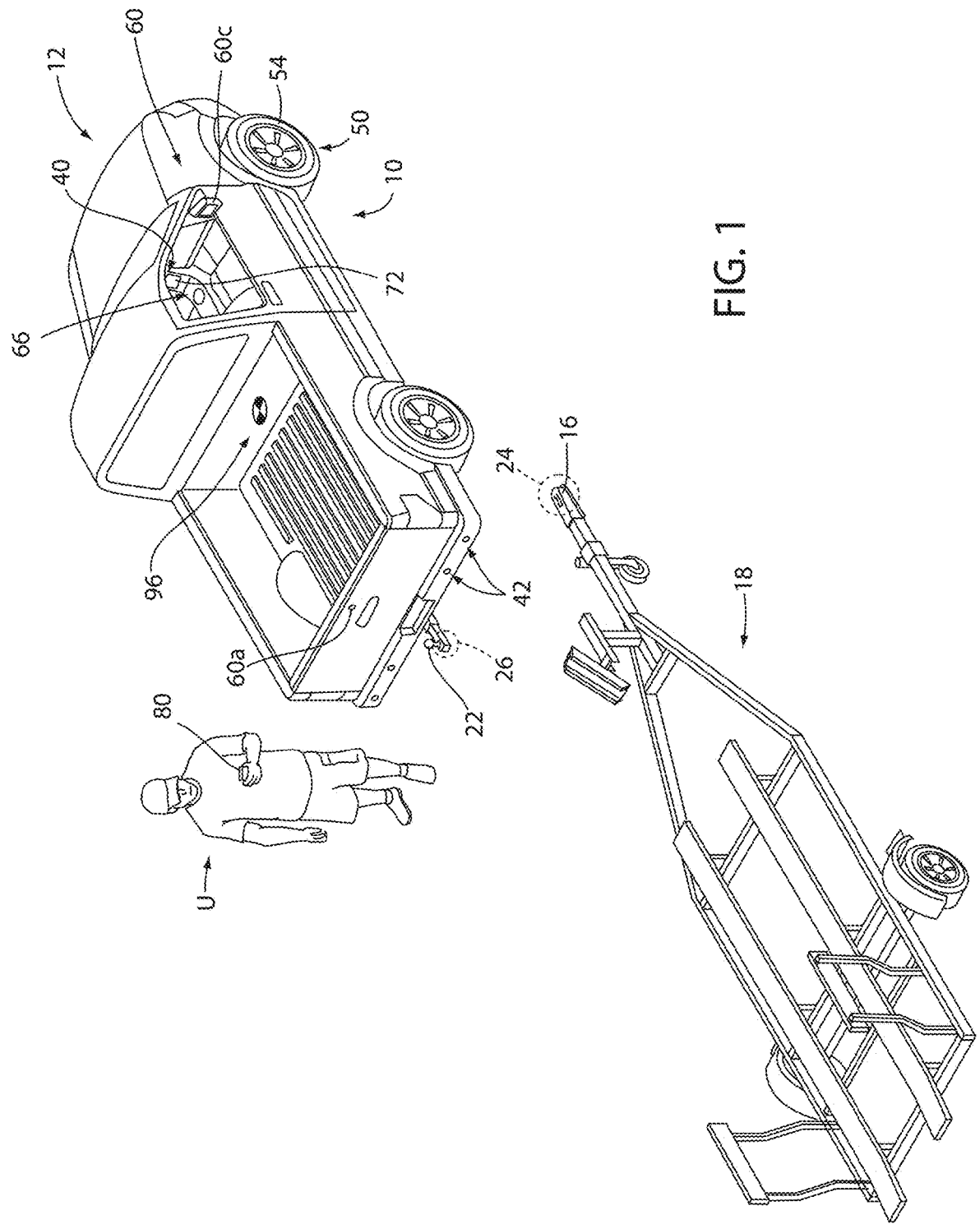
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-5, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some embodiments, the system 10 may be configured to detect a force applied to the hitch ball 22 or hitch assembly. The detection of forces applied to the hitch assembly and various methods related to the detection of forces applied to the hitch ball 22 are later discussed in reference to FIGS. 5-9. In general, the system may comprise a hitch detection apparatus 30 configured to detect a magnitude and/or direction of forces applied to the hitch ball 22 or the hitch assembly. The force direction may comprise a towing or longitudinal force and a load or gravitational force. Based on the force direction, the controller 14 may be configured to identify or estimate a height $H_c$ of the coupler 16 relative to a height $H_b$ of the hitch ball 22. For example, the controller 14 may be configured to approximate how far the height $H_c$ of the coupler 16 is below the height $H_b$ of the hitch ball 22 based on the forces detected by the hitch detection apparatus 30. Accordingly, the disclosure may provide for the hitch apparatus 30 to be implemented in various ways to improve operation of an automatic or assisted hitch alignment sequence.

Figure 2:
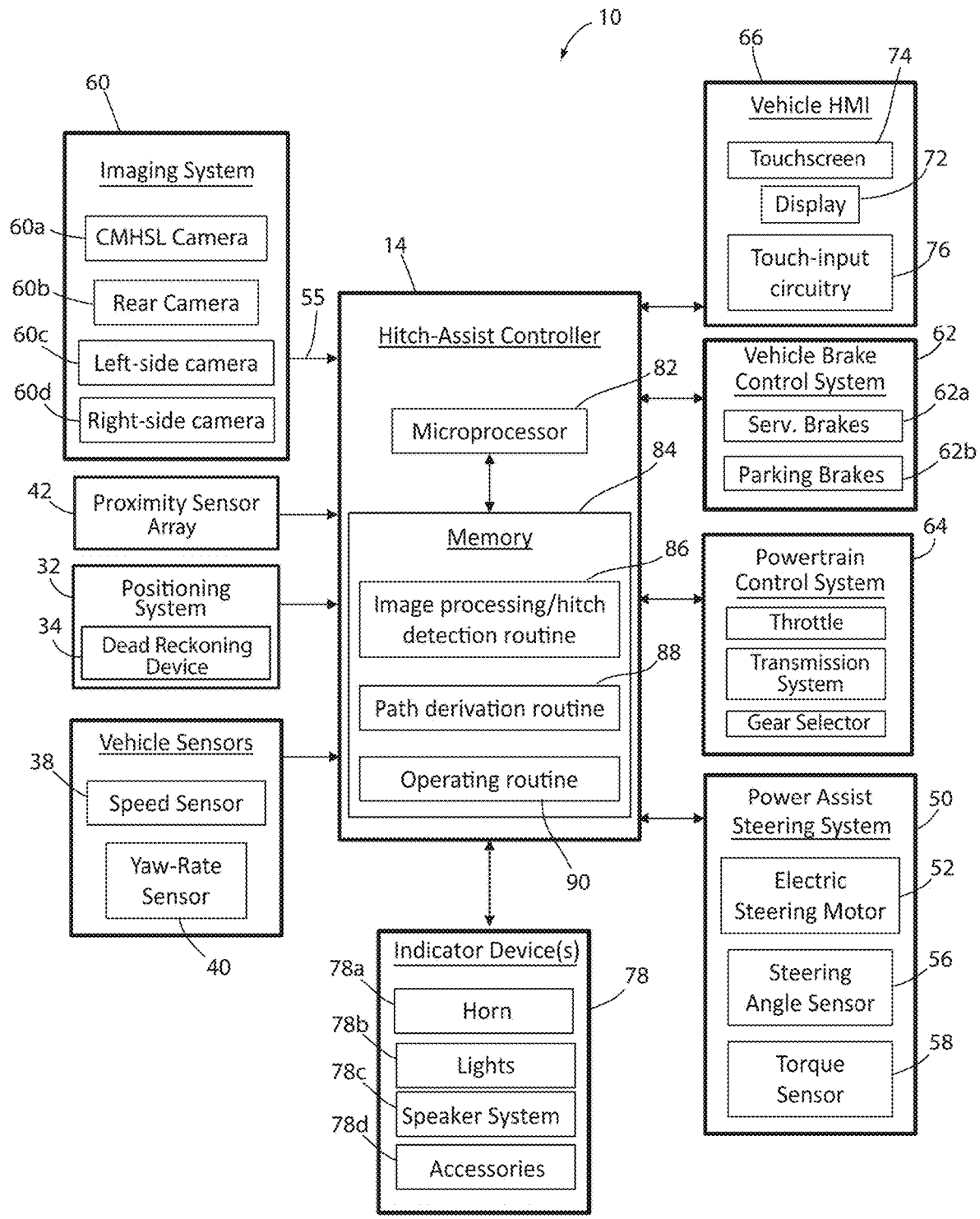
FIG. 2 is a diagram of a system according to an aspect of the disclosure for assisting in aligning the vehicle with a trailer in a position for hitching the trailer to the vehicle.
Figure 3:
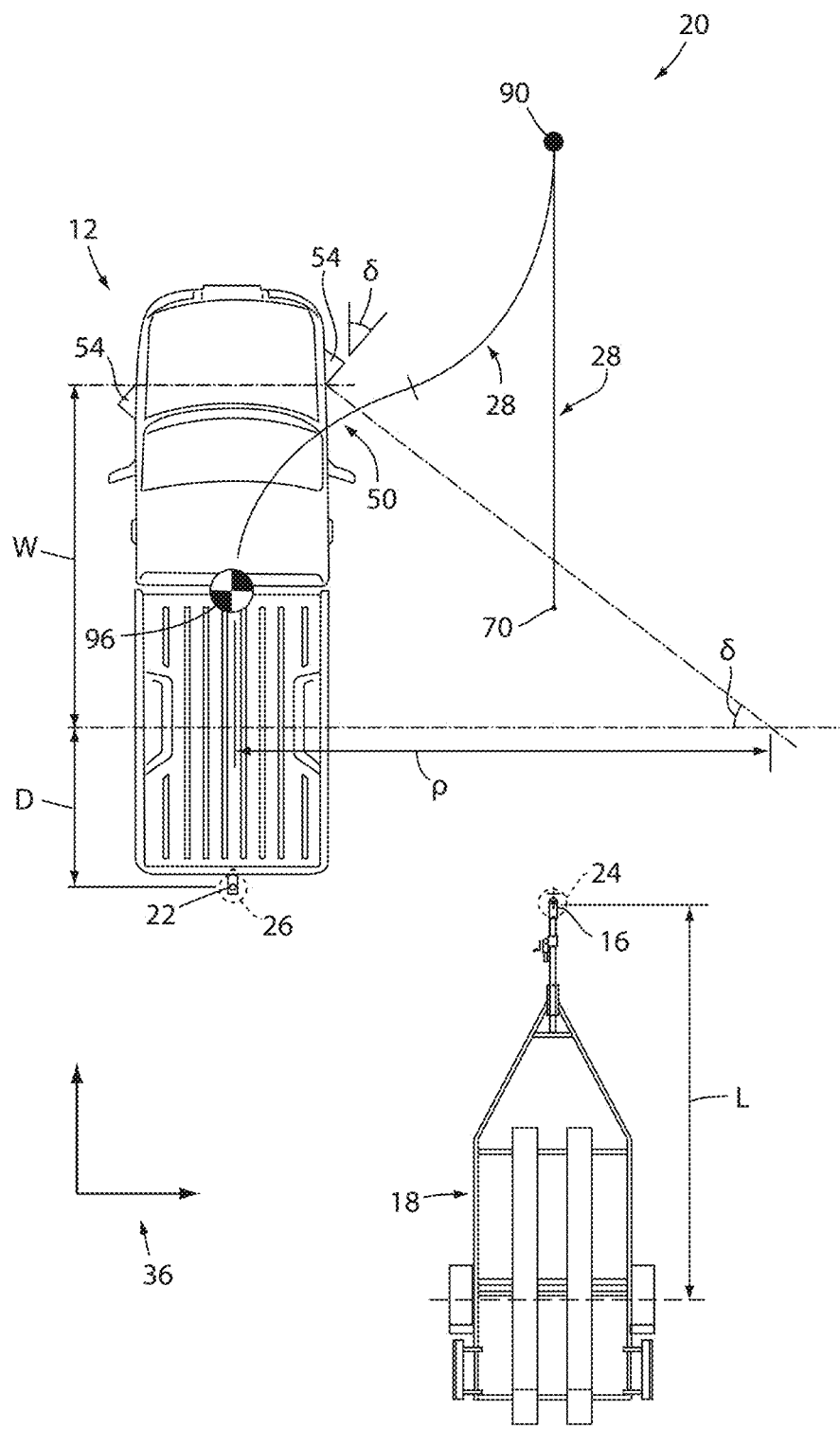
FIG. 3 is an overhead schematic view of a vehicle during a step of the alignment sequence with the trailer.
Figure 4:
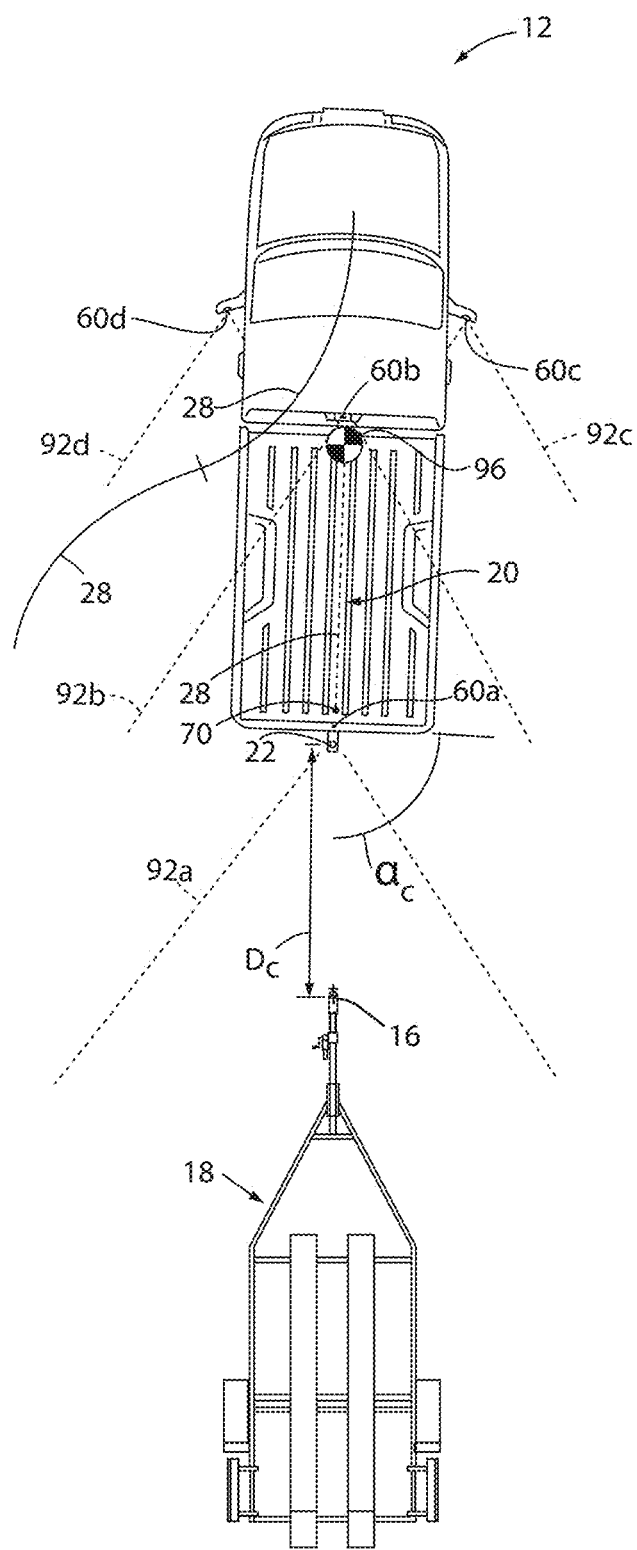
FIG. 4 is a is an overhead schematic view of a vehicle during a step of the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from a yaw rate sensor 40. It is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $α_c$) of coupler 16.

As further shown in FIG. 2, one embodiment of the hitch assist system 10 is in communication with the steering system 50 of vehicle 12. The steering system 50 may be a power assist steering system 50 including a steering motor 52 to operate the steered wheels 54 (FIG. 1) of the vehicle 12 for moving the vehicle 12 in such a manner that the vehicle yaw changes with the vehicle velocity and the steering angle S. In the illustrated embodiment, the power assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power assist steering system 50 that allows a steering wheel to be partially decoupled from movement of the steered wheels 54 of such a vehicle.

With continued reference to FIG. 2, the power assist steering system 50 provides the controller 14 of the hitch assist system 10 with information relating to a rotational position of steered wheels 54 of the vehicle 12, including a steering angle S. The controller 14 in the illustrated embodiment processes the current steering angle, in addition to other vehicle 12 conditions to guide the vehicle 12 along the desired path 20 (FIG. 3). It is conceivable that the hitch assist system 10, in additional embodiments, may be an integrated component of the power assist steering system 50. For example, the power assist steering system 50 may include a hitch assist algorithm for generating vehicle steering information and commands as a function of all or a portion of information received from an imaging system 60, the power assist steering system 50, a vehicle brake control system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle yaw rate sensor 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a collision with trailer 18, and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated collision with a portion of trailer 18. As mentioned above, regulation of the speed of the vehicle 12 may be advantageous to prevent collision with trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power assist steering system 50 for affecting steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, center high-mount stop light (CHMSL) camera 60b, and side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in co-pending, commonly-assigned U.S. patent application Ser. No. 15/583,014, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle δ can be used to determine a corresponding turning radius ρ for vehicle 12 according to the equation:

$$\rho = \frac{1}{W \tan \delta} \quad (1)$$

in which the wheelbase W is fixed and the steering angle δ can be controlled by controller 14 by communication with steering system 50, as discussed above. In this manner, when the maximum steering angle $\delta_{max}$ is known, the smallest possible value for the turning radius prim, is determined as:

$$\rho_{min} = \frac{1}{W \tan \delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

Figure 5:
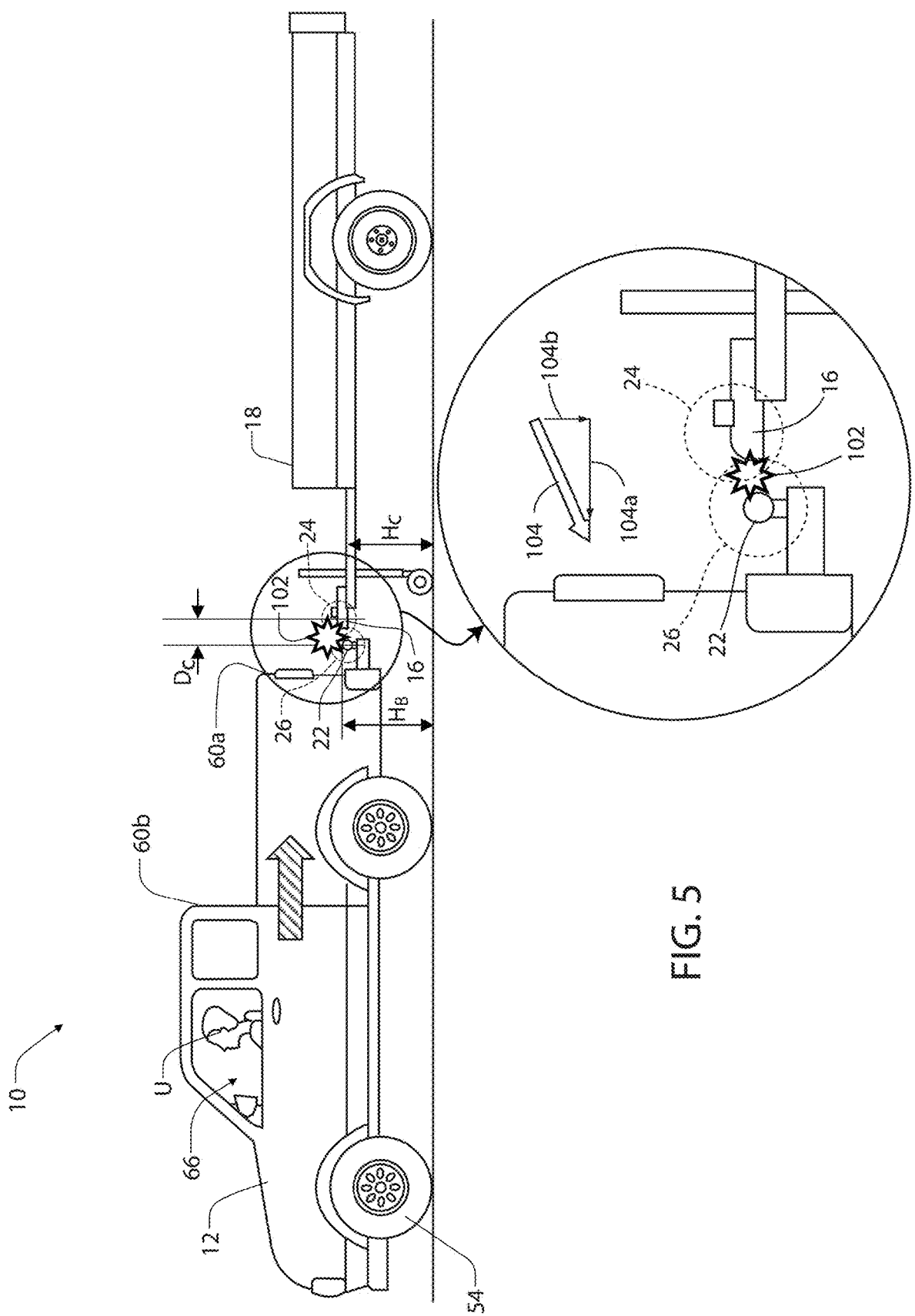
FIG. 5 is a side view of the vehicle operating in a rearward direction approaching the trailer.

Referring now to FIG. 5, a schematic diagram of the vehicle 12 moving toward the trailer 18 in reverse is shown. In some embodiments, the system 10 may be configured to detect a force applied to the hitch ball 22 or hitch assembly. The force is demonstrated in FIG. 5 as an interference 102 or collision between the coupler 16 of the trailer 18 and the hitch ball 22 during the automatic or assisted hitch alignment sequence. Such an interference 102 may occur under controlled conditions wherein the operating speed of the vehicle 12 is limited by the controller 14. Accordingly, the force associated with the interference 102 may be controlled by the system 10 such that the vehicle 12 and/or the trailer are not damaged and the trailer is not significantly relocated as a result of the force.

The force associated with the interference 102 may be detected by the hitch detection apparatus 30. The hitch detection apparatus 30 may be configured to determine a force direction 104 resulting from the interference 102. The force direction 104 may comprise a towing or longitudinal force 104a and a load or gravitational force 104b. Based on the force direction 104, the controller 14 may be configured to identify or estimate a height $H_c$ of the coupler 16 relative to a height $H_b$ of the hitch ball 22. For example, the controller 14 may be configured to approximate how far the height $H_c$ of the coupler 16 is below or above the height $H_b$ of the hitch ball 22. Based on the relative height of the coupler 16 to the hitch ball 22, the controller 14 may adjust or instruct the user to adjust the height $H_c$ of the coupler 16. Further details of the hitch detection apparatus are discussed in reference to FIGS. 7 and 8.

Figure 6:
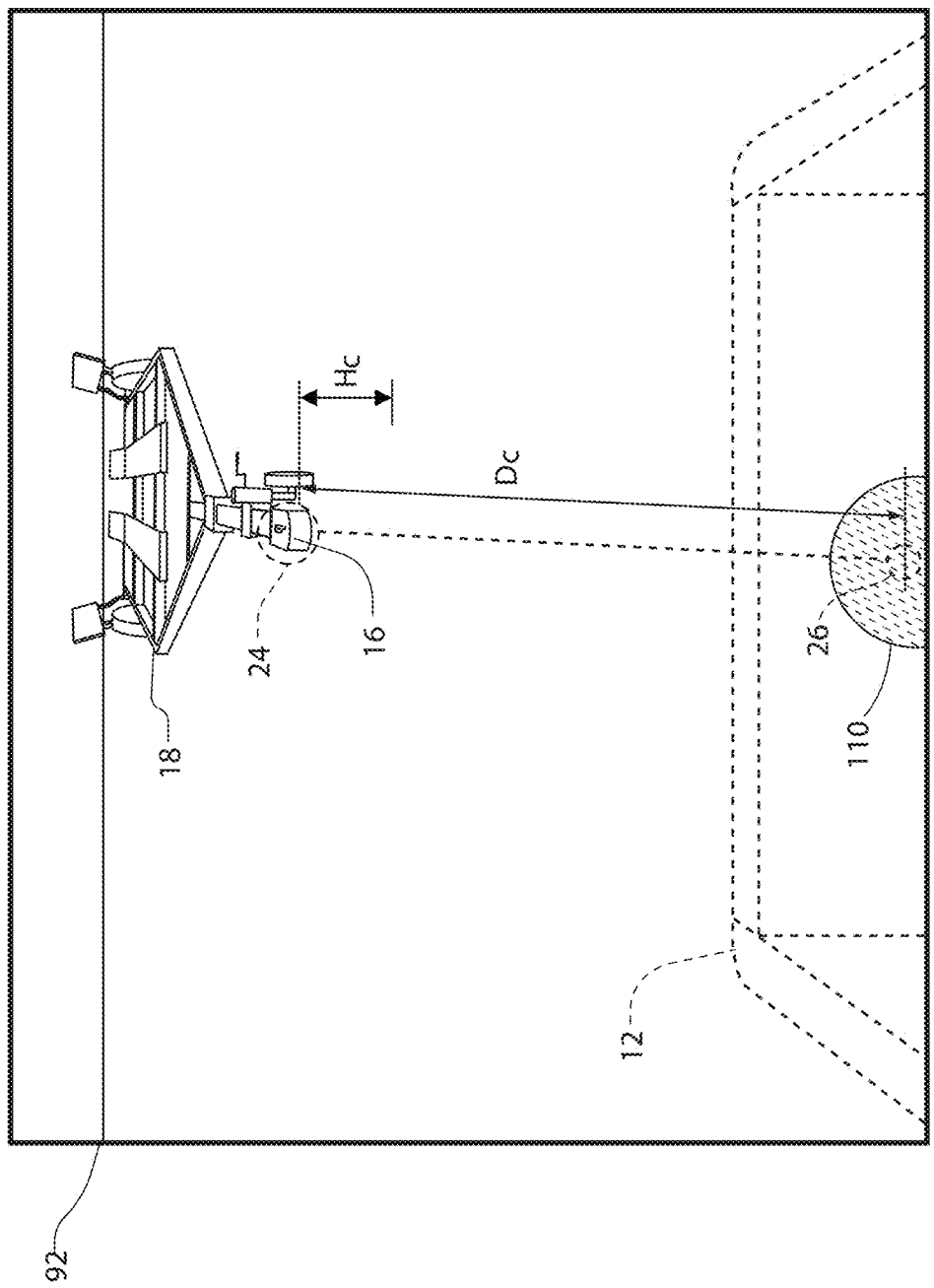
FIG. 6 is a projected view of image data demonstrating a alignment sequence with the trailer.

FIG. 6 demonstrates image data that may be captured in one or more of the fields of view 92a-92d captured by the cameras 60a-60d of the imaging system 60. Referring now to FIGS. 5 and 6, the system 10 may be configured to process the image data captured in the fields of view 92 to identify the coupler position 24 of the coupler 16. As previously discussed, during the approach of the vehicle 12 along the vehicle path 20, the interference 102 or collision between the coupler 16 of the trailer 18 and the hitch ball 22 may occur. During operation, the controller 14 may adjust an operating speed of the vehicle 12 in response to the hitch ball 22 approaching the coupler position 24 of the coupler 16. For example, the controller 14 may slow the vehicle 12 to an approach speed in response to the hitch ball 22 being within a proximity 110 of the coupler position 24. The proximity 110 may be a pre-configured or predetermined distance between a known or approximated hitch position 26 and the coupler position 24 identified by the controller 14. In this way, the controller 14 may control the hitch alignment sequence to automatically control the vehicle 12 to decrease an operating speed as the hitch ball 22 approaches the coupler position 24.

Figure 7:
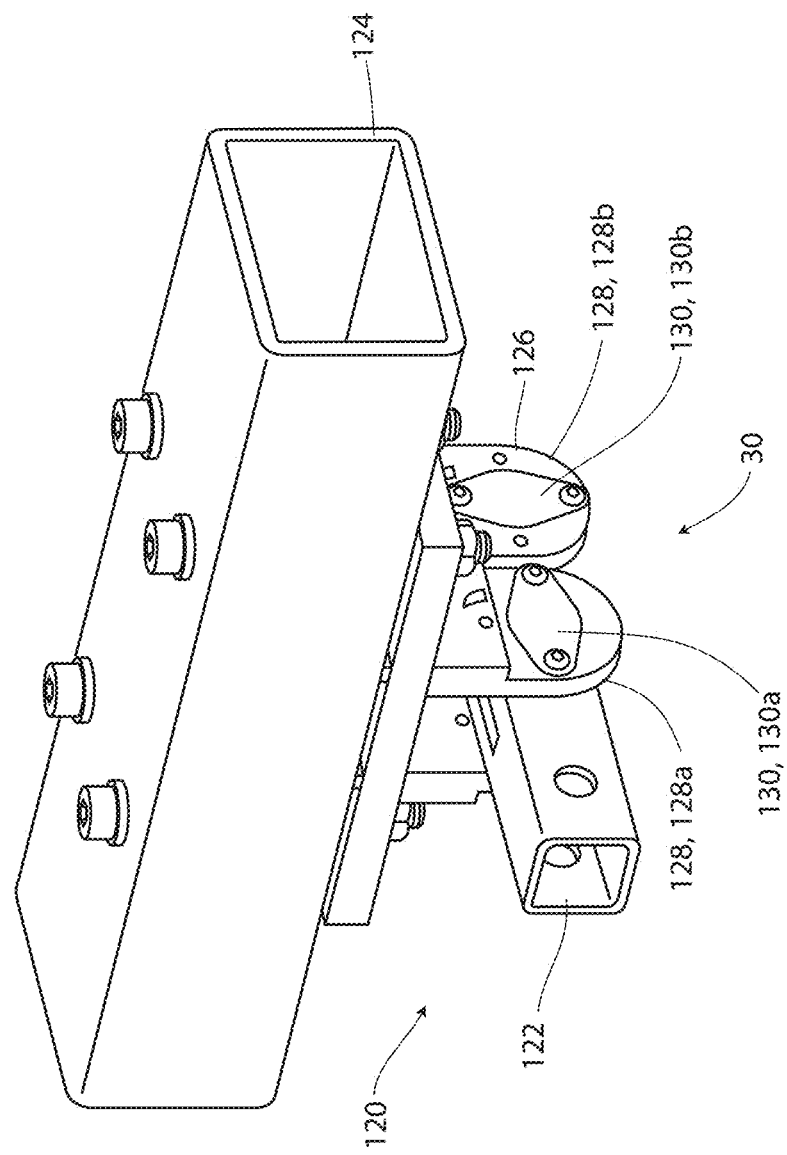
FIG. 7 is a projected view of a hitch assembly including a hitch detection apparatus.

Referring now to FIG. 7, an exemplary embodiment of the hitch detection apparatus 30 is shown. As previously discussed, the hitch detection apparatus 30 may be configured to detect a magnitude and/or direction of forces applied to the hitch ball 22 or the hitch assembly 120. As demonstrated in FIG. 7, the hitch assembly 120 may comprise a hitch receiver 122 that may be connected to a vehicle frame 124 or body portion via a hitch mount 126. In this configuration, the hitch receiver 122 may be configured to receive the hitch ball 22 such that the hitch ball 22 is supported by the frame 124.

In some embodiments, the hitch mount 126 may comprise a plurality of mounting brackets 128 configured to receive and support the hitch receiver 122. The mounting brackets 128 may comprise a first mounting bracket 128a and a second mounting bracket 128b. The first mounting bracket 128a may comprise a first force sensor 130a configured to measure the longitudinal force 104a applied to the hitch assembly 120. The second mounting bracket 128b may comprise a second force sensor 130b configured to measure the gravitational force 104b applied to the hitch receiver 122. Each of the first and second force sensors 130a, 130b may be in communication with the controller 14 such that the controller 14 may utilize the detection of the longitudinal forces 104a and gravitational forces 104b in controlling the automated hitch sequence of the system 10.

The force sensors 130 may comprise load cells in the form of strain gauges or similar transducers configured to detect the magnitude of forces applied to the hitch assembly 120. Each of the force sensors 130 may be aligned with the corresponding directional force (e.g., the longitudinal force 104a, the gravitational force 104b, etc.) such that the controller 14 may identify the force direction 104 as a summation of the component forces measured by each of the force sensors 130. Accordingly, in response to the interference 102 between the hitch ball 22 and the coupler 16, signals corresponding to the force direction 104 resulting from the interference 102 may be transmitted from the force sensors 130 to the controller 14. In this configuration, the controller 14 may utilize the signals from the force sensors 130 to enable various operating methods in response to the detection of the interference 102.

Figure 8:
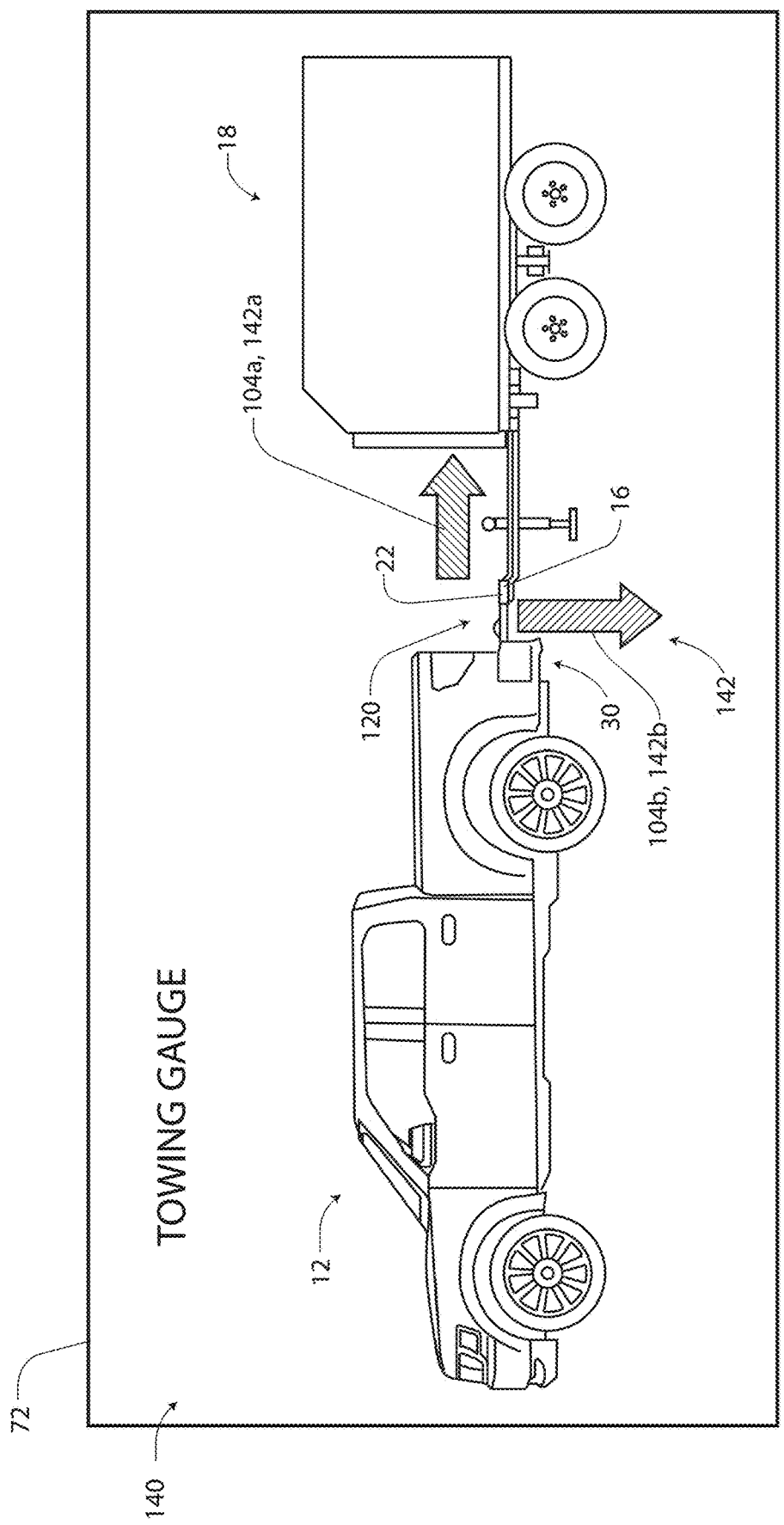
FIG. 8 is a diagram of a towing gauge demonstrating a force detection of the hitch detection apparatus.

Referring now to FIG. 8, a diagram of a towing gauge 140, which may be displayed on the display 72 or various other display devices of the system 10 is shown. The towing gauge 140 may comprise a graphic depiction of the vehicle 12 and the trailer 18. The vehicle 12 may be illustrated in connection with the trailer 18 via the hitch assembly 120 interconnecting the hitch ball 22 with the coupler 16. Accordingly, the towing gauge 140 may provide for a graphical depiction of the vehicle 12 in connection with the trailer 18 and may further be configured to demonstrate one or more forces detected by the force sensors 130 of the hitch detection apparatus 30.

As demonstrated in FIG. 8, the longitudinal force 104a and the gravitational force 104b detected by the hitch detection apparatus 30 are demonstrated as arrows 142. The arrows 142 may vary in proportion or magnitude to demonstrate the relative force applied to the hitch assembly 120 by the trailer 18 throughout operation of the vehicle 12. For example, in response to the longitudinal force 104a increasing, a first arrow 142a may increase in length demonstrating an increased magnitude of force applied in the longitudinal direction. Similarly, in response to the gravitational force 104b increasing, the second arrow 142b may increase in proportion to the force detected by the hitch detection apparatus 30. In this way, the towing gauge 140 may provide for visual feedback to the user U of the system 10 demonstrating the direction and magnitude of the longitudinal force 104a and gravitational force 104b via the arrows 142a and 142b, respectively.

Figure 9:
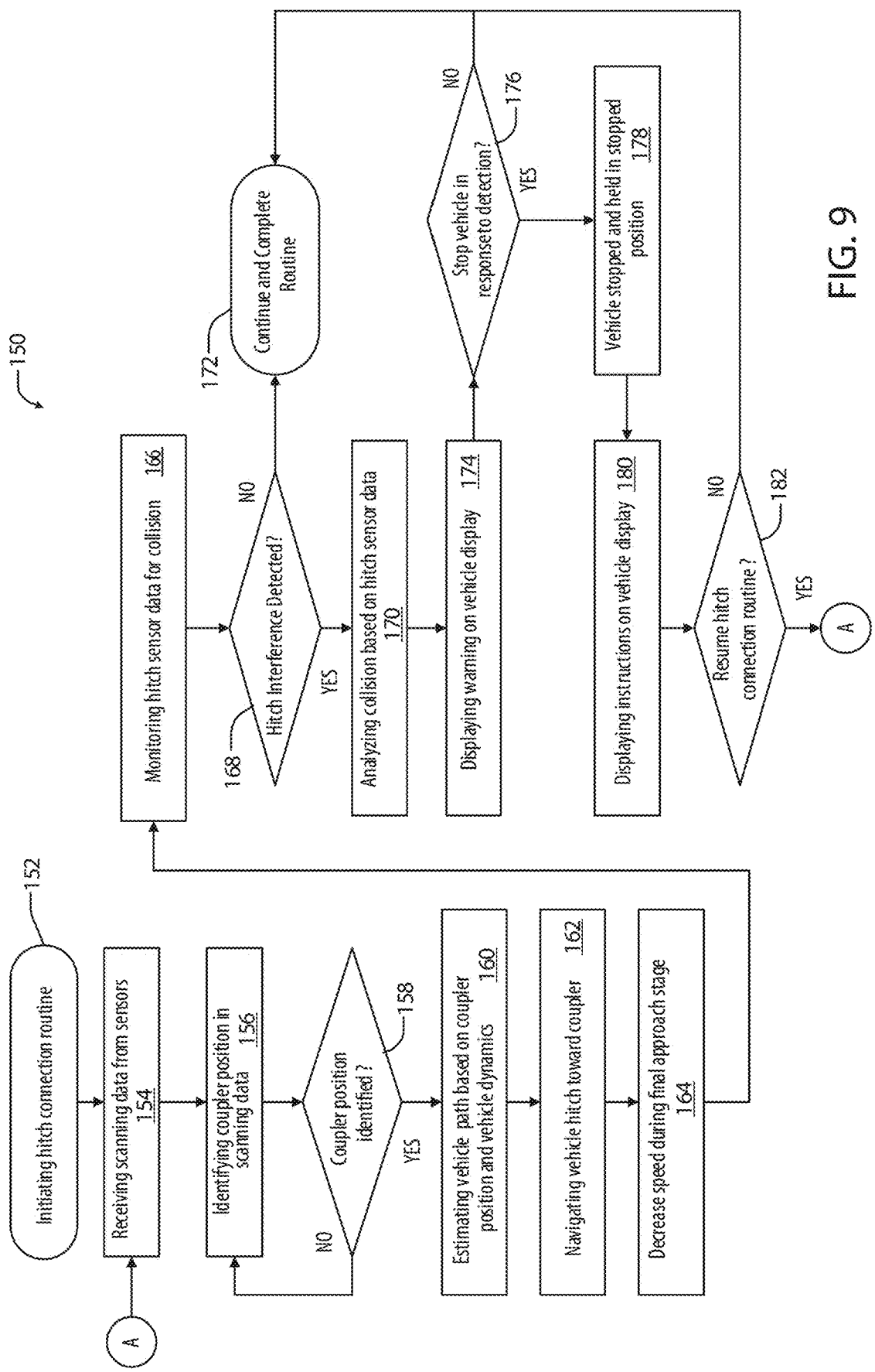
FIG. 9 is a flow chart demonstrating a method for detecting an interference and adjusting a height of a coupler of the trailer in accordance with the disclosure.

Referring now to FIG. 9, a flowchart is shown demonstrating a method 150 for operating the system 10 in conjunction with the hitch detection apparatus 30. The method 150 may begin by initiating a hitch connection routine (152). The hitch connection routine may begin by activating the imaging system 60 such that the controller receives scanning data from one or more of the cameras 60a-60d or sensors (154). Based on the scanning data or image data, the controller 14 may identify the coupler 16 of the trailer 18 in the scanning data (156). With the scanning data, the controller 14 may apply the image-processing routine 86 to identify the coupler position 24 (158). If the coupler position 24 is not identified, the method 150 may return to step 156. However, if the coupler position 24 is identified, the method 150 may continue by estimating the vehicle path 20 based on the coupler position 24 and the dynamics of the vehicle 12 (160).

Once the vehicle path 20 is identified, the controller 14 may navigate the vehicle 12 such that the hitch position 26 is aligned with the coupler position 24 (162). As the hitch position 26 approaches the coupler position 24 within the proximity 110, the controller may adjust or decrease an operating speed of the vehicle 12 providing for a slow and controlled approach during a final approach stage of the vehicle path 20 (164). Throughout the navigation of the vehicle 12 through the vehicle path 20 and particularly during the final approach stage, the controller 14 may monitor data communicated by the first force sensor 130a and the second force sensor 130b of the hitch detection apparatus 30 (166). Based on the data communicated by the hitch detection apparatus 30, the controller 14 may identify a collision or the interference 102 between the trailer 18 and the hitch ball 22. The interference 102 may be detected by the controller 14 in response to the signals communicated by either of the force sensors 130 exceeding a predetermined force or load threshold.

Based on the data communicated by the force sensors 130, if the interference 102 is detected in step 168, the controller 14 may continue the method 150 by analyzing the interference 102 based on the data communicated by the force sensors 130 (170). If the interference 102 is not detected in step 168, the controller 14 may continue and/or complete the hitch connection routine by aligning the hitch position 26 of the vehicle 12 with the coupler position 24 (172). Accordingly, the controller 14 may detect the interference 102 and apply additional control steps discussed in reference to numerals 174-182.

As previously discussed, the controller 14 may analyze the signals communicated from the force sensors 130 to determine a direction and magnitude of the longitudinal force 104a and the gravitational force 104b applied to the hitch assembly 120. Based on the direction and magnitude of the forces detected by the force sensors 130, the controller 14 may identify a height $H_c$ of the coupler 16 relative to the height $H_b$ of the hitch ball 22. For example, upon detecting the longitudinal force 104a directed from the trailer 18 toward the vehicle 12, or the gravitational force 104b directed in an upward or downward direction, the controller 14 may identify the interference 102.

More specifically, if the gravitational force 104b is identified by the controller 14 as being directed slightly upward, the controller 14 may identify that the coupler 16 is below the hitch ball 22. In such a condition, the height $H_c$ of the coupler 16 may require an increase over a first distance. If the controller 14 identifies the longitudinal force 104a in conjunction with a relatively minimal gravitational force 104b, the controller 14 may identify that the height $H_c$ of the coupler 16 is aligned with the height $H_b$ of the hitch ball 22 such that the height $H_c$ of the coupler 16 must be increased over a second distance. In yet another circumstance, if the controller 14 identifies that the gravitational force 104b is directed slightly downward, the controller 14 may identify that the height $H_c$ of the coupler 16 is nearly above or adequate to provide clearance over the $H_b$ of the hitch ball 22 such that the height $H_c$ of the coupler need only be adjusted upward a short distance or a third distance. The specific distances required for adjustment of the height $H_c$ of the coupler 16 may vary based on the specific proportions of the hitch ball 22 and other physical dimensions of the hitch assembly 120 and the coupler 16. However, in general as discussed herein, the first distance may be greater than the second distance, and the second distance may be greater than the third distance.

If the longitudinal force 104a and/or the gravitational force 104b exceed the predetermined threshold or interference threshold, the controller may display a warning of the interference 102 on the display 72 (174). In step 176, if the magnitude or severity of the interference 102 and the corresponding forces identified by the force sensors 130 exceed an operating threshold, the controller 14 may control the vehicle 12 to stop in response to the interference 102 (178). If the magnitude or severity of the interference 102 does not exceed the operating threshold, the controller 14 may continue to step 172 to complete the hitch connection routine. For example, if the forces communicated by the force sensors 130 indicate only a small downward gravitational force 104b, the controller 14 may continue to align the hitch position 26 with the coupler position 24 by following the vehicle path 20. Under such circumstances, a downward gravitational force 104b less than a first threshold accompanied by a longitudinal force 104a less than a second threshold may indicate that the interference 102 only amounts to slight rubbing between the coupler 16 and hitch ball 22 such that the alignment of the hitch ball 22 with the coupler 16 may be completed without adjusting the height $H_c$ of the coupler 16.

If the vehicle 12 is stopped and held in step 178, the controller 14 may display instructions on the display 72 identifying that the user U must exit the vehicle and increase the height $H_c$ of the coupler 16 (180). In some embodiments, the instructions may also be displayed on the portable device 80. Additionally, the HMI 66, which may be embodied by the touchscreen 74 and/or the portable device 80, may display a prompt in step 182 requesting authorization to continue the hitch connection routine. If the user U does not continue the hitch connection routine, the method may continue to step 172 to cancel or complete the routine. If the user U identifies that the hitch connection routine should resume in step 182, the method may return to step 152 to scan data from the sensors (e.g., the imaging system 60) and identify the coupler position 24. Accordingly, the method 150 may provide for an intuitive and convenient method to complete the hitch connection routine and prompt the user U to adjust the height $H_c$ of the coupler 16 as necessary.

In some embodiments, if the gravitational force 104*b* (i.e., the force aligned with gravity) detected by the force sensor 130*b* is negative or slightly upward and accompanied by a longitudinal force 104*a* detected by the first force sensor 130*a*, the controller 14 may identify that the coupler 16 is below the hitch ball 22. Under such conditions, the hitch ball may be trapped or pinned beneath the coupler 16 such that the height $H_c$ of the coupler 16 cannot be adjusted upward without the interference 102 increasing. Under such circumstances, the controller 14 may additionally move the vehicle 12 away from the trailer between steps 176 and 178. Once the vehicle 12 is positioned away from trailer 18 such that the coupler does not interfere with the adjustment of the height $H_c$ of the coupler 16, the controller 14 may continue the method 150 by progressing to steps 178 and 180. In this way, the system 10 may ensure that there is adequate clearance between the hitch ball 22 and the coupler 16 such that the height $H_c$ of the coupler 16 may be adjusted without further interference 102.

The specific detailed steps discussed in reference to the various embodiments and methods described herein are examples provided to demonstrate some useful applications of the systems and devices disclosed by the application. It shall be understood that the hitch detection apparatus 30, the hitch assembly 120, the force sensors 130, and each of the corresponding related elements implemented to complete the various methods discussed herein are provided as exemplary illustrations of the disclosure. Accordingly, the detailed embodiments shall not be considered limiting to the scope of the disclosure.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle system, comprising:
   a hitch mounted on a vehicle;
   at least one sensor in connection with the hitch; and
   a controller comprising a processor that:
      identifies a force applied to the hitch via the at least one sensor, wherein the force results from a collision between a portion of the hitch and a coupler of a trailer;
      in response to the force, approximates a direction of the force; and
      generates connection instructions identifying a height adjustment of the coupler of the trailer for connection to the hitch of the vehicle based on the direction, wherein the connection instructions comprise at least one of an audible and a visual instruction identifying the height adjustment.

2. The system according to claim 1, wherein the controller further:
   identifies the force as a longitudinal force applied along a length of the hitch and a load force applied along a height of the ball.

3. The system according to claim 2, wherein the at least one sensor comprises a first sensor configured to measure the load force and a second sensor configured to measure the longitudinal force and wherein the direction of the force is approximated based on a combination of the load force and the longitudinal force.

4. The system according to claim 3, wherein the controller further:
   identifies a height direction of the height adjustment in response to the direction of the force.

5. The system according to claim 1, wherein the controller outputs an instruction indicating the height adjustment of the coupler height in response to the force exceeding a threshold.

6. The system according to claim 1, wherein the controller further:
   controls motion of the vehicle in an automated hitch alignment routine; and
   stops the motion of the vehicle in response to the force exceeding a threshold.

7. The system according to claim 6, wherein the controller further:
  continues the automated hitch alignment routine in response to the force being less than the threshold.

8. The system according to claim 1, further comprising:
  a sensor apparatus in communication with the controller, wherein the sensor apparatus scans a region proximate the vehicle and detects the coupler position of the coupler of the trailer.

9. The system according to claim 8, wherein the sensor apparatus comprises an imaging system including one or more cameras mounted on the vehicle, wherein:
  the controller identifies the coupler position based on image data received from the imaging system comprising position data of the coupler.

10. The system according to claim 8, wherein the controller identifies the collision in response to the detection of the force in combination with the hitch being within a predetermined distance of the coupler position.

11. The system according to claim 10, wherein the predetermined distance identifies that the hitch is within a collision proximity relative to the coupler.

12. The system according to claim 1, wherein the coupler position is a location of the coupler of the trailer, wherein the coupler is configured to mate to the hitch in a towing configuration.

13. A method for controlling a vehicle system comprising:
  receiving detection signals from a vehicle hitch sensor identifying an impact force applied to a vehicle hitch, wherein the impact force is from a contact of a vehicle maneuvering into a trailer;
  detecting a longitudinal force applied along a length of the hitch and a load force applied along a height of the hitch based on the detection signals;
  approximating a force direction as a combination of component parts of the longitudinal force and the load force based on the detection signals;
  identifying a height adjustment of a coupler of the trailer based on the force direction; and
  in response to the force direction, generating instructions for adjusting a height of the coupler.

14. The method according to claim 13, further comprising:
  identifying a direction of a height adjustment of the coupler based on the magnitude of the longitudinal force and the load force.

15. The method according to claim 13, further comprising:
  controlling motion of the vehicle in an automated hitch alignment routine; and
  stopping the motion of the vehicle in response to the impact force exceeding a threshold.

16. A system for a vehicle, comprising:
  a hitch mounted on a vehicle;
  an imaging system including one or more cameras mounted on a vehicle;
  a force sensor in connection with the hitch; and
  a controller comprising a processor that:
    identifies a coupler position of a coupler based on image data received from the imaging system;
    controls motion of the vehicle aligning the hitch with the coupler position;
    detects a force applied to the hitch via the force sensor, wherein the force results from the motion of the vehicle causing an impact with the coupler;
    in response to the force, approximates a force direction of an interference between the coupler of a trailer and the hitch; and
    generates instructions comprising a direction for a height adjustment of the coupler for connection to the hitch based on the force direction.

17. The system according to claim 16, wherein the controller further:
  stops the motion of the vehicle in response to the force exceeding a threshold.

18. The system according to claim 16, wherein the instructions comprise at least one of an audible and a visual instruction identifying the height adjustment.

\* \* \* \* \*